United States Patent
Valenci et al.

(10) Patent No.: US 7,181,527 B2
(45) Date of Patent: Feb. 20, 2007

(54) METHOD FOR TRANSMITTING LOAD BALANCING IN MIXED SPEED ENVIRONMENTS

(75) Inventors: Moshe Valenci, Givat-Zeev (IL); Tal Shustak, Jerusalem (IL); Gil Baruch, Mevaseret Zion (IL); Rony Bitan, Yehud (IL)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 10/113,481

(22) Filed: Mar. 29, 2002

(65) Prior Publication Data

US 2003/0217172 A1    Nov. 20, 2003

(51) Int. Cl.
*G06F 15/16* (2006.01)

(52) U.S. Cl. ............... 709/234; 709/233; 709/234; 718/102; 718/105; 370/229; 370/235

(58) Field of Classification Search ............ 709/204, 709/223, 226, 228, 203, 217–218, 233, 234; 718/102–106; 370/392, 422, 229–235
See application file for complete search history.

(56) References Cited

U.S. PATENT DOCUMENTS

| | | | | |
|---|---|---|---|---|
| 5,892,754 A * | 4/1999 | Kompella et al. | ........ | 370/236 |
| 6,078,943 A * | 6/2000 | Yu | ........ | 718/105 |
| 6,195,680 B1 * | 2/2001 | Goldszmidt et al. | ........ | 709/203 |
| 6,327,622 B1 * | 12/2001 | Jindal et al. | ........ | 709/228 |
| 6,343,313 B1 * | 1/2002 | Salesky et al. | ........ | 709/204 |
| 6,363,077 B1 * | 3/2002 | Wong et al. | ........ | 370/422 |
| 6,601,084 B1 * | 7/2003 | Bhaskaran et al. | ........ | 718/105 |
| 6,647,419 B1 * | 11/2003 | Mogul | ........ | 709/226 |
| 6,718,393 B1 * | 4/2004 | Aditya | ........ | 709/239 |
| 6,725,253 B1 * | 4/2004 | Okano et al. | ........ | 709/203 |
| 6,771,595 B1 * | 8/2004 | Gilbert et al. | ........ | 370/229 |
| 6,854,013 B2 * | 2/2005 | Cable et al. | ........ | 709/226 |
| 2002/0010783 A1 * | 1/2002 | Primak et al. | ........ | 709/228 |
| 2002/0054567 A1 * | 5/2002 | Fan | ........ | 370/230 |
| 2002/0141412 A1 * | 10/2002 | Wong et al. | ........ | 370/392 |
| 2003/0033425 A1 * | 2/2003 | Deshpande | ........ | 709/233 |
| 2003/0055971 A1 * | 3/2003 | Menon | ........ | 709/226 |
| 2003/0108052 A1 * | 6/2003 | Inoue et al. | ........ | 370/399 |
| 2005/0097445 A1 * | 5/2005 | Day et al. | ........ | 715/501.1 |

* cited by examiner

*Primary Examiner*—ThuHa Nguyen
(74) *Attorney, Agent, or Firm*—Pillsbury Winthrop Shaw Pittman LLP

(57) ABSTRACT

A method for transmitting load balancing in mixed speed environments such as physical interface speed changes and client flow speed changes is disclosed. Components such as an association module, a flow redirector, a channel assignment module, and a balancing timer are employed. The association module is a data structure that contains an association between client connections and a network interface. The flow redirector redirects transmitted network packets to the network interfaces based on the data, which is provided by the load balancing association. The channel assignment module is advised when such association data does not exist. The channel assignment module creates the association between the client connection- and the network interface, which is stored in the load balancing association. The decisions that this module makes affect the actual balancing between the network interfaces. The balancing timer computes throughput for client flows and re-associates client flows to the network interfaces.

20 Claims, 4 Drawing Sheets

METHOD FOR TRANSMITTING LOAD BALANCING IN MIXED SPEED ENVIRONMENTS

BACKGROUND

1. Field of the Invention

Embodiments described herein are directed to a method for transmitting load balancing in mixed speed environments such as during physical interface speed changes and client flow speed changes. Specifically, a load balancing association, a main flow redirector, and a channel assignment module are implemented.

2. Related Art

Traffic load-balancing algorithms are necessary for providing an equal share of loads between network interfaces. In order to preserve the transmission order of packets, classical load balancers generally assign client connections to network interfaces. Various parameters may change, however, after assigning clients to these network interfaces. For example, the speed of the physical media interface may dynamically change. The client traffic intensity/flow rate may similarly change.

Such changes cause performance degradation because of a lack of an optimization method that considers these dynamic changes. Furthermore, handling these parameters without the dynamic changes is non-trivial. While transmitting load balancing solutions exist, they do not support mixed speeds proportional load balancing. A common load balancer generally assumes that it is using an equal capabilities lower interface. As such, the necessity for a design that is adaptive to the above-described changes is critical toward providing a high performance solution for mixed speed network interfaces.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

Figure 1:
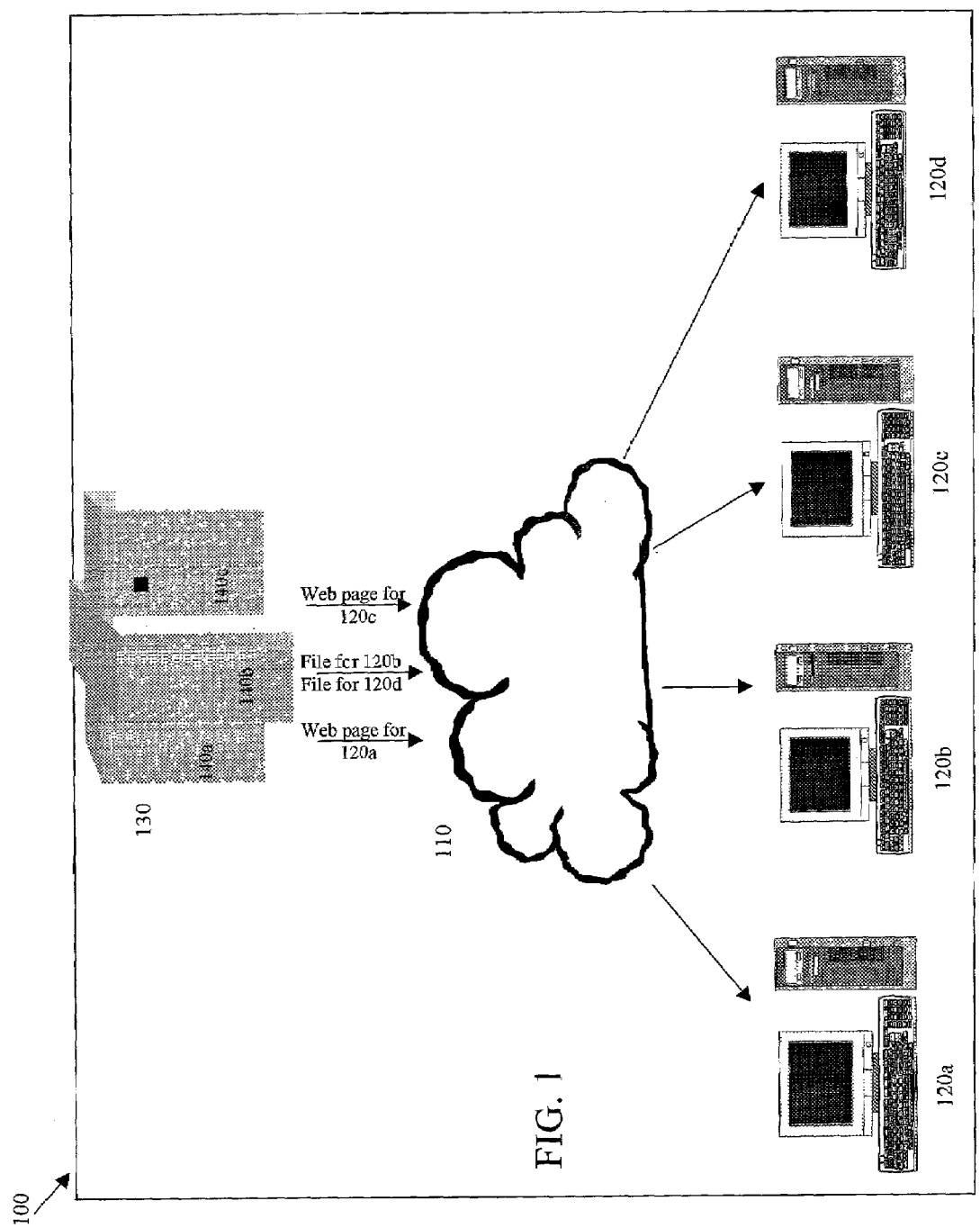
FIG. 1 is a diagram of load balancing for transmission, according to an embodiment of the present invention.

The following paragraphs describe a method for transmitting load balancing in mixed speed environments such as, but not limited to, physical interface speed changes and client flow speed changes. FIG. 1 shows an example of a transmitting load balancing system 100 whereby client connections 120a–d are assigned to different network interfaces 140a–c across a data communication network 110. The data communication network 110 may include the Internet, an Intranet, or any combination of public and private data communication networks. The data communication network 110 may be configured as a local-area network, wide-area network, or another kind of architecture. Multiple clients may be assigned to one network interface 140b, for example. Also coupled to the data communication network 110 is a server 130, which houses the various network interfaces 140a–c. FIG. 1 illustrates one embodiment of the topology of the transmitting load balancing system 100. The server 130 may further be situated, for example, between the data communication network 110 and the client connections 120a–d.

Figure 2:
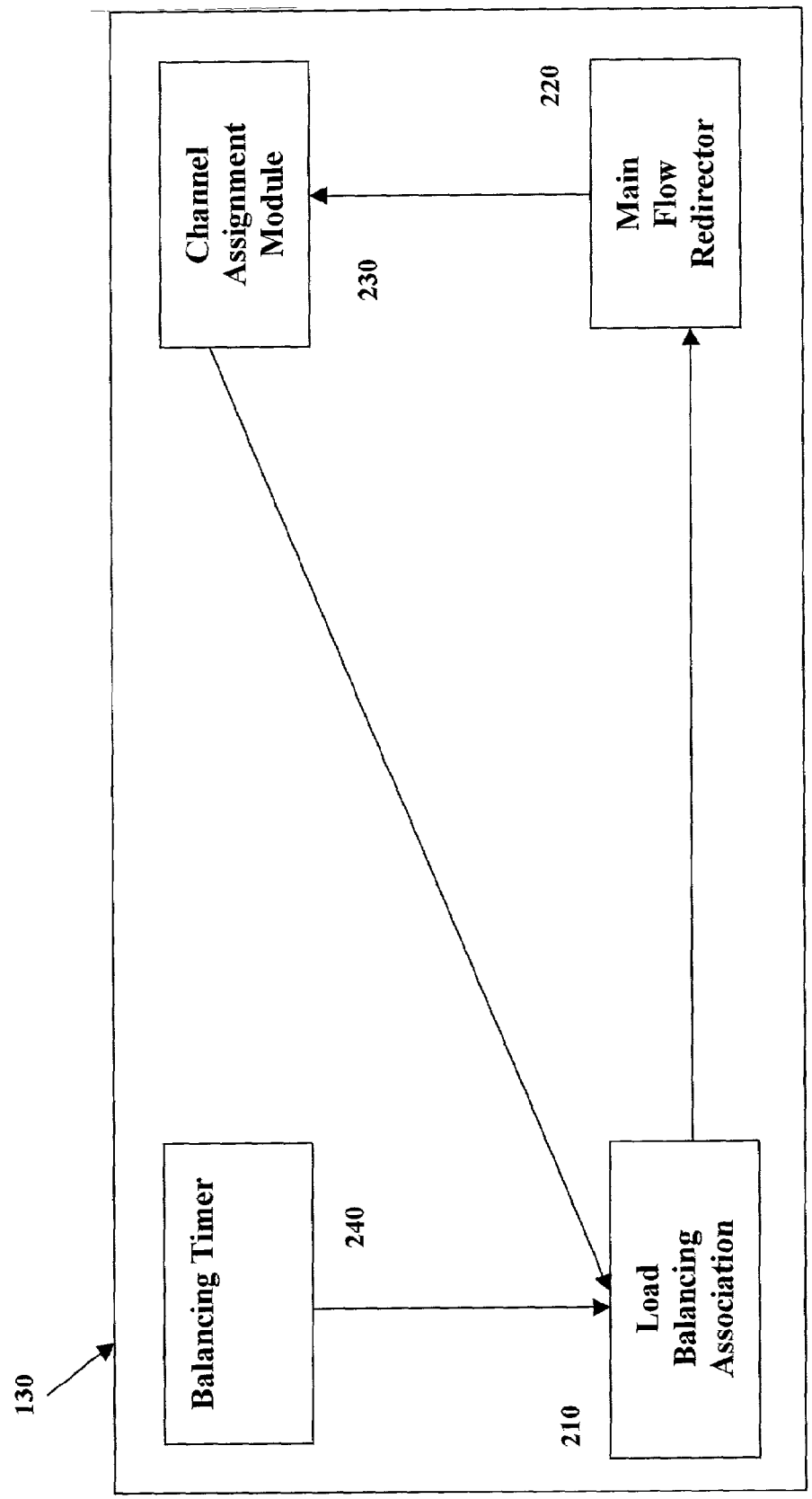
FIG. 2 is a block diagram of the sub-components in a load balancing system for transmission, according to an embodiment of the present invention.

As shown in FIG. 2, four sub-components, a load balancing association 210, a main flow redirector 220, a channel assignment module 230, and a balancing timer 240 are used in the load balancing system 100. These sub-components reside within the server 130. That is, the server 130 is responsible for decision-making within the transmitting load balancing system 100. The load balancing association 210, the main flow director 220, the channel assignment module 230, and the balancing timer 240 may be software and can be run by one or more software programs.

The load balancing association 210 is a data structure that contains an association between client connections 120a–d and a network interface 140a–c. A client connection 120a–d provides representation of a flow between the server 130 and a client. The main flow redirector 220 redirects transmitted network packets to the various network interfaces 140a–c based on data, which is provided by the load balancing association 210. When such association data does not exist, the channel assignment module 230 is advised. The channel assignment module 230 creates the association between the client connection 120a–d and the network interface 140a–c, which is stored in the load balancing association 210. The decisions that the channel assignment module 230 makes affect the actual balancing between the network interfaces 140a–c. The load balancing association 210 and the main flow redirector 220 are common modules of load balancing systems. In the present transmitting load balancing system 100, connections are added to the load balancing association 210, and the channel assignment module 230 is introduced.

The load balancing association 210 is extended to maintain statistical information for each client flow for client connections 120a–d and for each network interface 140a–c. When a new client flow is being created, statistics are temporarily unknown. Statistics include, for example, transmit byte count, load, and throughput information.

The channel assignment module 230 associates a given client flow of a client connection 120a–d with a network interface 140a–c and stores the association in the load balancing association 210. Association decisions are made based on variables such as, for example, packet type, client flow statistics, and network interface physical link speed and statistics. The channel assignment module 230 chooses the least loaded network interface 140a–c to be associated with a client flow. A least loaded network interface 140a–c is an interface with a maximum adapter gap value, which is provided in the following formula: Adapter Gap=Physical Adapter Link Speed−Adapter Current Load, where Adapter Current Load=$\Sigma$(Client Flow History Throughput)+$\Psi$(Optional Receive Load).

Optional receive load is an optional value that may reflect certain systems where there is a relation between the transmit load and the receive load. $\Psi$ is a constant between zero (0) and one (1) that signifies the multiplicand importance. $\Sigma$ sums all of the transmit throughput values of client flows, which are associated with the subjected adapter. After associating a channel with a network interface, the adapter current load value is updated by adding the associated client flow throughput. If flow history throughput information, i.e., a new flow with no history information is not provided for the client flow, a constant value is added to the adapter load.

A balancing timer 240 period is the designated duration to provide correction to a given change in speed configuration. A timer period typically sets up in approximately ten seconds. A periodic balancing timer 240 function is composed of statistics maintenance, network interface statistics, and channel reassignment. Regarding statistics maintenance, the client history throughput value is updated for each client flow. The throughput is computed by calculating the client flow transmissions over the timer interval.

Concerning network interface statistics, load information is cleared for each network interface 140a–c. With respect to channel reassignment, after all statistical information is updated, all of the client flow associations in the load balancing association 210 are recalculated and reassigned with the network interfaces 140a–c to provide optimized load balancing. Sorting the order of client flow, from high throughput to low, and calling the assignment function for the client flow in decreasing order provides for optimal balancing. It is also possible to have non-sorted order reassignments for less optimized implementations. This is achieved by deleting the load balancing association 210 while maintaining the client flow statistics, which causes an assignment function processing for each client flow during the main flow redirector 220 operation.

Figure 3:
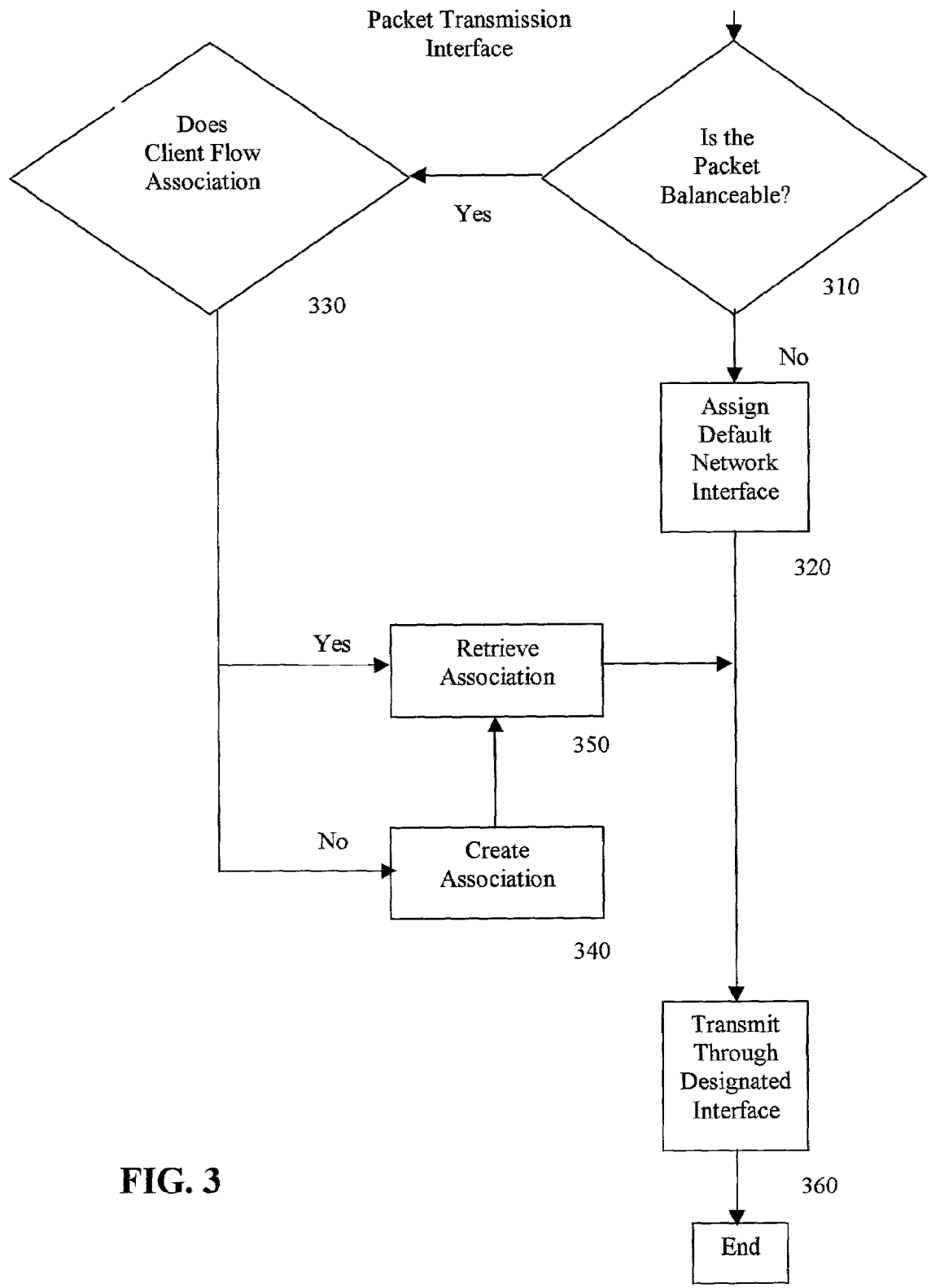
FIG. 3 is a flowchart for a packet transmission interface for mixed speed load balancing, according to an embodiment of the present invention.

FIG. 3 illustrates the steps involved in achieving mixed speed balancing at the packet transmission interface level. As shown in step 310, at the packet transmission interface level, it must first be determined whether a packet is balanceable. If the packet is not balanceable, a default network interface 140a–c is assigned, as depicted in step 320. If the packet is balanceable, it is determined whether a client flow association exists, as shown in step 330. If a client flow association does not exist, an association is created as illustrated in step 340, and then the association is retrieved as indicated in step 350. If a client flow association does exist, the association is retrieved as per step 350. Next, the packet is transmitted through a designated interface, as shown in step 360.

Figure 4:
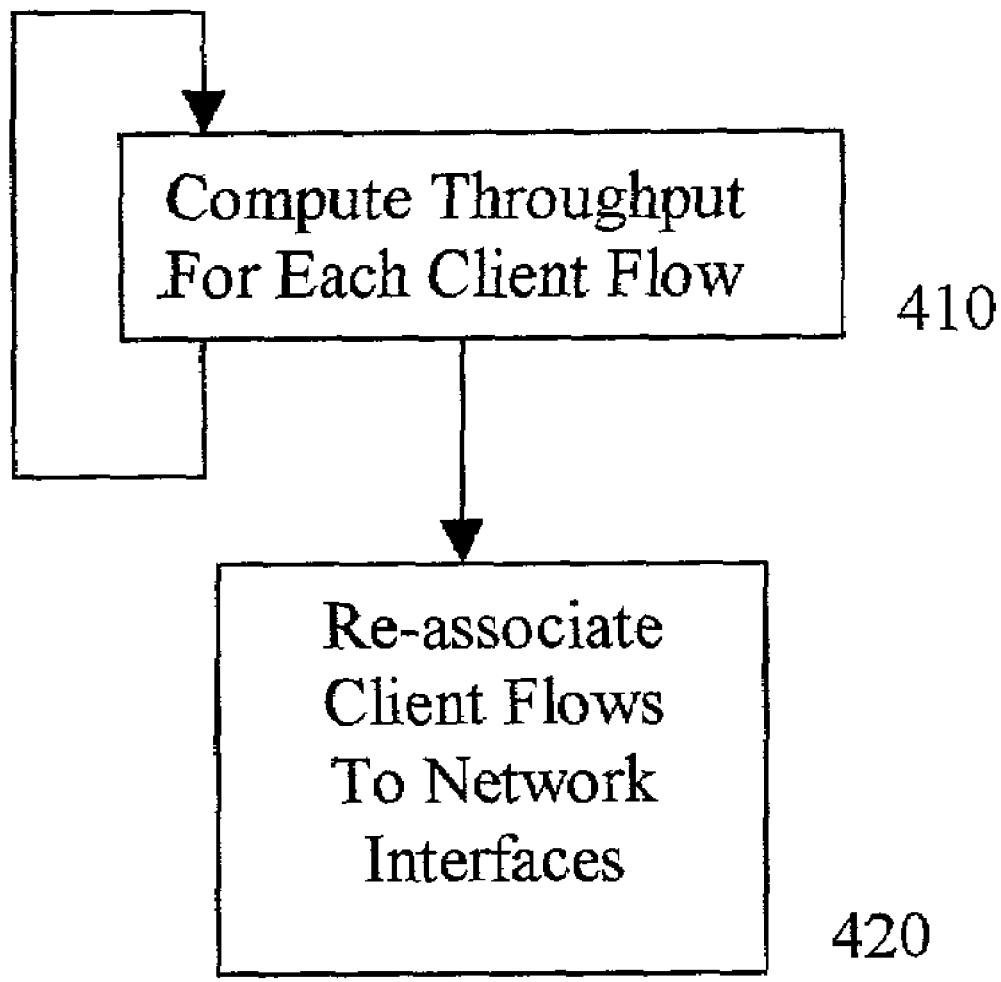
FIG. 4 is a flowchart for a balancing timer for mixed speed load balancing, according to an embodiment of the present invention.

FIG. 4 illustrates the steps involved in achieving mixed speed balancing using the balancing timer 240. The throughput for each client flow is computed, as illustrated in step 410. Next, as shown in step 420, the client flows to network interfaces 140a–c are reassociated. While the balancing timer 240 operates independently of the packet transmission interface level, the associations calculated at step 420 are the same associations that are retrieved at step 350.

An example of load balancing follows. Assume the presence of three client flows whereby A has a speed of 85 Mb/s, B operates at 900 Mb/s, and C functions at 50 Mb/s. Now assume the presence of two network interfaces whereby N1 has a link speed of 1,000 MB/s, and N2 has a link speed of 100 MB/s.

A, B, and C client flows are created instantly. That is, no history information is provided. The flow assignments are as follows for A: gap(N1)=1,000; gap(N2)=100, so A is assigned to N1. Assume that a constant value of 5 Mb/s is added to the network interface load. Now, gap(N1): 1,000−995=5, and gap(N2)=100. When C is assigned, gap(N1) =995, and gap(N2)=100, so C is assigned to N1. Again, assume that a constant value of 5 Mb/s is added to the network interface load. Now, gap(N1): 995−5=990, and gap(N2)=100. Based on these values, B is assigned to N1. Assume again that a 5 Mb/s constant value is added to the network interface load. Now, gap(N1): 990−5=985, and gap(N2)=100.

At this point, a protocol such as, for example, Transmission Control Protocol ("TCP") [Transmission Control Protocol, Request For Comments ("RFC") 793, published September 1981] tries to increase the data flow to the physical network/protocol limit. Various other protocols may similarly be used. Assuming that each flow receives a fair relative share, A will have a weighted average of 81 Mb/s; B will have a weighted average of 870 Mb/s; and C will have a weighted average of 48 Mb/s. Next, the periodic balancing timer evaluates the client flow speeds. Network interface load values are cleared, and reassignment occurs. A possible reassignment may occur as follows: gap(N1)=1000; gap (N2)=100, so B remains assigned to N1. Now, gap(N1): 1000−870=130, and gap(N2)=100. A thus remains assigned to N1. Gap(N1): 130−81=49, and gap(N2)=100. As such, C is reassigned to N2 which then makes gap(N1)=49 and gap(N2): 100−48=52. At this point, the client protocol, such as TCP for example, tries to increase the data flow to the physical protocol/network level. A can operate at 85 Mb/s; B can function at 900 Mb/s; and C can operate at 50 Mb/s. Such is an example of an optimal assignment. Accordingly, the performance of the transmit load balancing components improve while operating in this mixed speeds environment.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A method of load balancing in mixed speed environments, comprising:

retrieving an association of each of a plurality of client flows to one of a plurality of network interfaces;

collecting network statistics for each of the plurality of client flows for a timer period and updating the network statistics for each of the plurality of client flows; and reassociating each of the plurality of client flows to one of the plurality of network interfaces, the client flows being reassociated in an order of highest throughput to lowest throughput to a first network interface of the plurality of network interfaces, the first network interface having a highest available bandwidth;

wherein the highest available bandwidth is a highest network interface gap, which is calculated as a network interface link speed minus a network interface current load.

2. The method of claim 1, further including assigning a second highest throughput client flow to a network interface having the highest available bandwidth after the first client flow throughput has been subtracted from the available bandwidth of the network interface having the highest available bandwidth.

3. The method of claim 2, further including assigning a next highest throughput client flow to a network interface having the highest available bandwidth after the first highest throughput client flow and the second highest throughput client flow have been subtracted from the available bandwidth of the assigned network interfaces.

4. The method of claim 1, further including transmitting packets of the first client flow through the first network interface which was associated with the first client flow.

5. The method of claim 1, wherein an association module maintains the network statistics collected for the client flows.

6. The method of claim 1, further including modifying bandwidths of at least one of the network interfaces and reassociating each of the plurality of client flows to one of the plurality of network interfaces by assigning the first highest throughput client flow to a first network interface of the plurality of network interfaces having a highest available bandwidth after adjusting the bandwidth of the least one of the network interfaces to include the bandwidth modification.

7. A system for conducting load balancing in mixed speeds environments, comprising:
  a computer-readable medium; and
  computer-readable program code, stored on the computer-readable medium, the computer-readable program code having instructions, which when executed cause a server to:
  retrieve an association of each of a plurality of client flows to one of a plurality of network interfaces;
  collect network statistics for each of the plurality of client flows for a timer period and update the network statistics for each of the plurality of client flows; and
  reassociate each of the plurality of client flows to one of the plurality of network interfaces, the client flows being reassociated in an order of highest throughput to lowest throughput, the reassociating starting by first assigning a first highest throughput client flow to a first network interface of the plurality of network interfaces, the first network interface having a highest available bandwidth;
  wherein the highest available bandwidth is a highest network interface gap, which is calculated as a network interface link speed minus a network interface current load.

8. The system of claim 7, including instructions, which when executed, cause the server to assign a second highest throughput client flow to a network interface having the highest available bandwidth after the first client flow throughput has been subtracted from the available bandwidth of the network interface having the highest available bandwidth.

9. The system of claim 8, further including instructions which when executed cause the server to assign a next highest throughput client flow to a network interface having the highest available bandwidth after the first highest throughput client flow and the second highest throughput client flow have been subtracted from the bandwidth of the previously assigned network interfaces.

10. The system of claim 7, further including instructions which when executed cause the server to transmit packets of the first client flow through the first network interface which was associated with the first client flow.

11. The system of claim 7, wherein an association module maintains the network statistics collected for the client flows.

12. The system of claim 7, further including instructions, which when executed, cause the server to modify bandwidths of at least one of the network interfaces and reassociate each of the plurality of client flows to one of the plurality of network interfaces by assigning the first highest throughput client flow to a first network interface of the plurality of network interfaces having a highest available bandwidth after adjusting the bandwidth of the least one of the network interfaces to include the bandwidth modification.

13. A server for performing load balancing, comprising:
  a plurality of network interfaces;
  an association module that stores an association of a plurality of client flows to a corresponding one of the plurality of network interfaces and also stores statistical information for each of the plurality of client flows; and
  a balancing timer to count a balancing time period, wherein new network statistics are calculated for each of the plurality of client flows and a channel assignment module reassociates each of the plurality of client flows to a corresponding one of the plurality of network interfaces, the client flows being reassociated in an order of highest throughput to lowest throughput, the reassociating starting by first assigning a first highest throughput client flow to a first network interface of the plurality of network interfaces, the first network interface having a highest available bandwidth;
  wherein the highest available bandwidth is a highest network interface gap, which is calculated as a network interface link speed minus a network interface current load.

14. The server of claim 13, wherein the new network statistics ere stored in the association module.

15. The server of claim 13, wherein the reassociation of each of the plurality of client flows to one of the plurality of the network interfaces is stored in the association module.

16. The server of claim 13, wherein the network statistics includes transmit byte count, load, end throughput information.

17. The server of claim 13, further including e redirector module that transmits data from each of the plurality of client flows to the assigned network interface for each of the plurality of client flows.

18. The server of client 13, further including the channel assignment module assigning e second highest throughput client flow to e network interlace of the plurality of network interfaces having the highest available bandwidth after the first client flow throughput has been subtracted from the available bandwidth of the network interface having the highest available bandwidth.

19. The server of claim 18, further including assigning a next highest throughput client flow to e network interface having the highest available bandwidth after the first highest throughput client flow and the second highest throughput client flow have been subtracted from the available bandwidth of the assigned network interfaces.

20. The server of claim 13, further including modifying bandwidths of at least one of the network interfaces and reassociating each of the plurality of client flows to one of the plurality of network interfaces by assigning the first highest throughput client flow to a first network interface of the plurality of network interfaces having a highest available bandwidth after adjusting the bandwidth of the least one of the network interfaces to include the bandwidth modification.

* * * * *